US011910904B2

(12) United States Patent
Bourguignat et al.

(10) Patent No.: US 11,910,904 B2
(45) Date of Patent: Feb. 27, 2024

(54) PEN APPLICATOR SYSTEM FOR APPLYING A COSMETIC PRODUCT

(71) Applicant: ELC MANAGEMENT LLC, Melville, NY (US)

(72) Inventors: David Bourguignat, Brooklyn, NY (US); Marc Emile Lechanoine, New York, NY (US)

(73) Assignee: ELC MANAGEMENT LLC, Melville, NY (US)

( * ) Notice: Subject to any disclaimer, the term of this patent is extended or adjusted under 35 U.S.C. 154(b) by 0 days.

(21) Appl. No.: 17/581,547

(22) Filed: Jan. 21, 2022

(65) Prior Publication Data

US 2023/0232961 A1 Jul. 27, 2023

(51) Int. Cl.
*A45D 34/04* (2006.01)
*B05C 17/005* (2006.01)

(52) U.S. Cl.
CPC ........ *A45D 34/04* (2013.01); *A45D 2200/054* (2013.01); *A45D 2200/1018* (2013.01); *B05C 17/00583* (2013.01)

(58) Field of Classification Search
CPC ............ A45D 34/04; A45D 2200/1018; A45D 2200/054; B05C 17/00569; B05C 17/00583; B05C 17/005; B05C 17/00503; B05C 17/00506; B65D 35/00; B65D 35/08; B65D 47/42; B65D 49/02
USPC ...................................... 401/188 R, 183–186
See application file for complete search history.

(56) References Cited

U.S. PATENT DOCUMENTS 2,960,040 A * 11/1960 Bischoff ................. B05C 21/00 417/63
4,145,147 A * 3/1979 Schuck .............. A46B 11/0027 401/175
5,918,995 A * 7/1999 Puurunen ........... A46B 11/0058 401/184
9,629,438 B2 * 4/2017 Bruder ................... A45D 40/26
2011/0158737 A1 6/2011 Ki
2014/0050515 A1 2/2014 Bruder
2017/0354232 A1 12/2017 Kim et al.

FOREIGN PATENT DOCUMENTS

JP 2021-104619 A 7/2021
JP 2021-108785 A 8/2021

OTHER PUBLICATIONS

International Application No. PCT/US2023/060926, International Search Report and Written Opinion, dated May 17, 2023.

* cited by examiner

*Primary Examiner* — David J Walczak
(74) *Attorney, Agent, or Firm* — MARSHALL, GERSTEIN & BORUN LLP

(57) ABSTRACT

An applicator system for containing and dispensing a cosmetic substance may include a container defining a cavity and including an open first end and a closed second end, a dispensing mechanism operably coupled with the first end of the container, and an applicator. The dispensing mechanism includes an elongated body defining a dispensing cavity and further includes at least one flexible region engageable by a user. The applicator includes an external surface and an interior cavity that may accommodate at least a portion of the dispensing mechanism. Upon engaging the at least one flexible region of the dispensing mechanism, a predetermined quantity of cosmetic substance is dispensed to the external surface of the applicator.

14 Claims, 5 Drawing Sheets

PEN APPLICATOR SYSTEM FOR APPLYING A COSMETIC PRODUCT

FIELD OF THE DISCLOSURE

The present disclosure generally relates to cosmetic, hair care, body care, and/or skincare products and, more particularly, to systems and approaches for applying such products.

BACKGROUND

Cosmetic, hair care, body care, and/or skincare products may be provided in a number of different containers, and may be applied using a number of varying approaches. As an example, a concealer product may be applied using a user's finger, an applicator brush, and/or a sponge product, among other alternatives. When applying such products, it may be difficult for a user to accurately dispense an appropriate quantity of product to provide coverage for the desired area. In instances where too much product is dispensed from the container, the excess product may be difficult and/or impossible to return to its container, and ultimately may need to be discarded, thereby resulting in wasted product. Conversely, in instances where too little product is dispensed from the container, the user's experience may be adversely impacted due to needing to repeatedly dispense additional product. Additionally, existing approaches may lack customization capabilities and may be difficult to use when attempting specific application techniques. Further, existing products may be disposable in nature, and as such may lead to environmental waste.

Accordingly, there is a need for improved accessories having improved functionalities.

SUMMARY

Examples within the scope of the present disclosure are directed to an applicator system for containing and dispensing a cosmetic substance. Such a system may include a container defining a cavity and including an open first end and a closed second end, a dispensing mechanism operably coupled with the first end of the container, and an applicator. The dispensing mechanism includes an elongated body defining a dispensing cavity and further includes at least one flexible region engageable by a user. The applicator includes an external surface and an interior cavity that may accommodate at least a portion of the dispensing mechanism. Upon engaging the at least one flexible region of the dispensing mechanism, a predetermined quantity of cosmetic substance is dispensed to the external surface of the applicator.

In an approach, the system may include a first orifice restriction positioned at a first end of the elongated body of the dispensing mechanism and a second orifice restriction positioned at a second end of the elongated body of the dispensing mechanism. In some of these examples, at least one of the first orifice restriction or the second orifice restriction is constructed from a liquid silicone rubber material. Further, in some examples, the first and the second orifice restrictions may each include a one-way valve that selectively permits and/or restricts the cosmetic product from flowing through the dispensing cavity.

In some of these approaches, when the applicator system is in an initial state, the predetermined quantity of cosmetic substance is disposed within the dispensing cavity. Upon engaging the at least one flexible region of the dispensing mechanism, the predetermined quantity of cosmetic substance is dispensed through the second orifice restriction and to the interior cavity of the applicator. In some forms, upon the predetermined quantity of cosmetic substance being dispensed through the second orifice restriction, the second orifice restriction closes, thereby generating a vacuum within the dispensing cavity that causes a second predetermined quantity of cosmetic substance to be drawn from the cavity of the container through the first orifice and to the dispensing cavity.

In some forms, the applicator includes a flow through head that defines the cosmetic substance to the external surface thereof. Further, in some examples, the applicator is constructed from an open cell foam material.

In some examples, the predetermined quantity of cosmetic substance is approximately 10 microliters. Further, in some examples, the dispensing mechanism may be removably coupled with the container. In these and other examples, the applicator may be removably coupled with the dispensing mechanism.

In accordance with a second aspect, an approach for dispensing a cosmetic substance from an applicator is provided. The applicator system includes a container defining a cavity and including an open first end and a closed second end, a dispensing mechanism operably coupled with the first end of the container, and an applicator having an interior cavity adapted to accommodate at least a portion of the dispensing mechanism. The approach includes disposing a predetermined quantity of cosmetic substance within a dispensing cavity of the dispensing mechanism. Further, at least one flexible region of the dispensing mechanism is engaged, thereby causing the predetermined quantity of cosmetic substance to be dispensed through the dispensing cavity and to the applicator. The at least one flexible region of the dispensing mechanism is released, thus forming a vacuum within the dispensing cavity that causes a subsequent predetermined quantity of cosmetic substance to be drawn into the dispensing cavity.

BRIEF DESCRIPTION OF THE DRAWINGS

The above needs are at least partially met through provision of one, more than one, or any combination of the approaches for applicator systems for applying a cosmetic product described in the following detailed description, particularly when studied in conjunction with the drawings, wherein.

Figure 1:
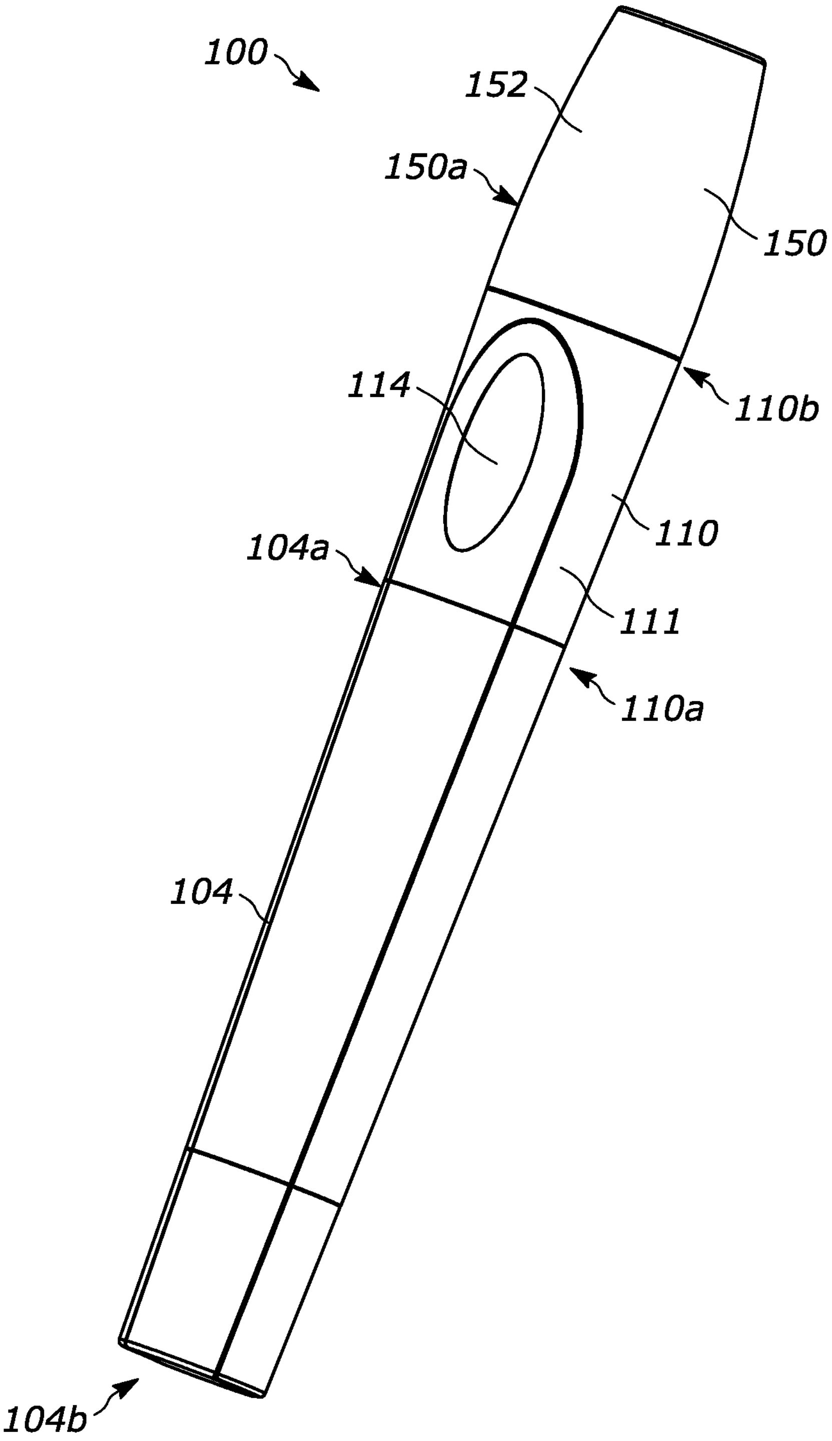
FIG. 1 illustrates a perspective view of an example applicator system in accordance with various examples.
Figure 3:
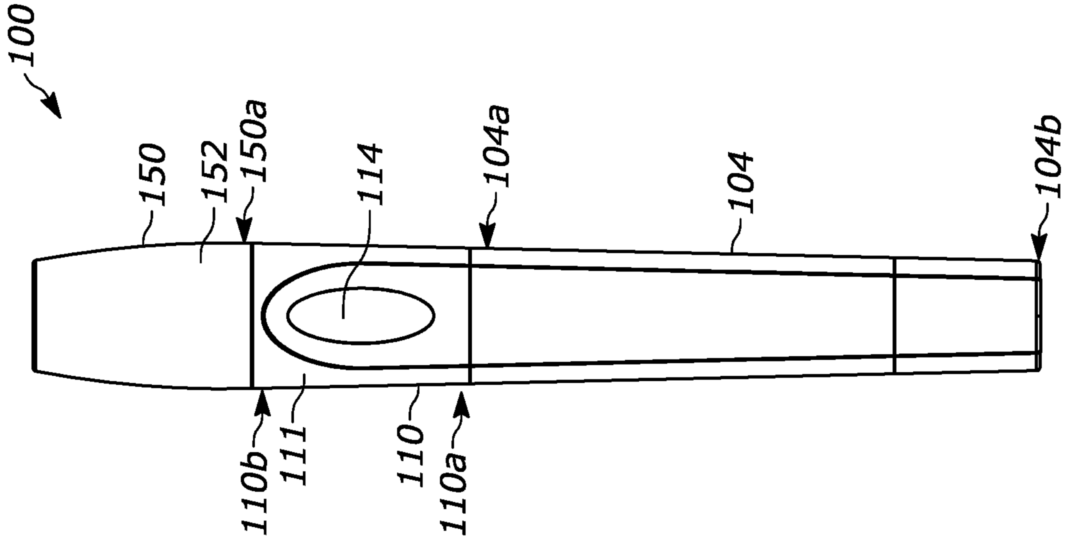
FIG. 3 illustrates a front elevation view of the example applicator system of FIGS. 1 & 2 in accordance with various examples.
Figure 2:
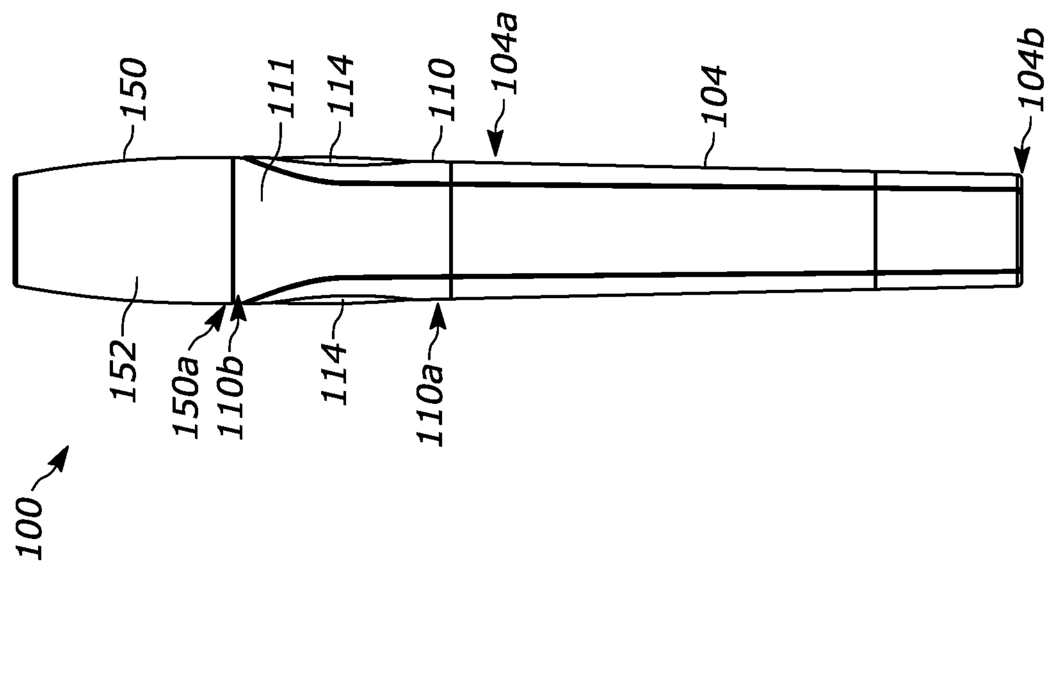
FIG. 2 illustrates a side elevation view of the example applicator system of FIG. 1 in accordance with various examples.
Figure 4:
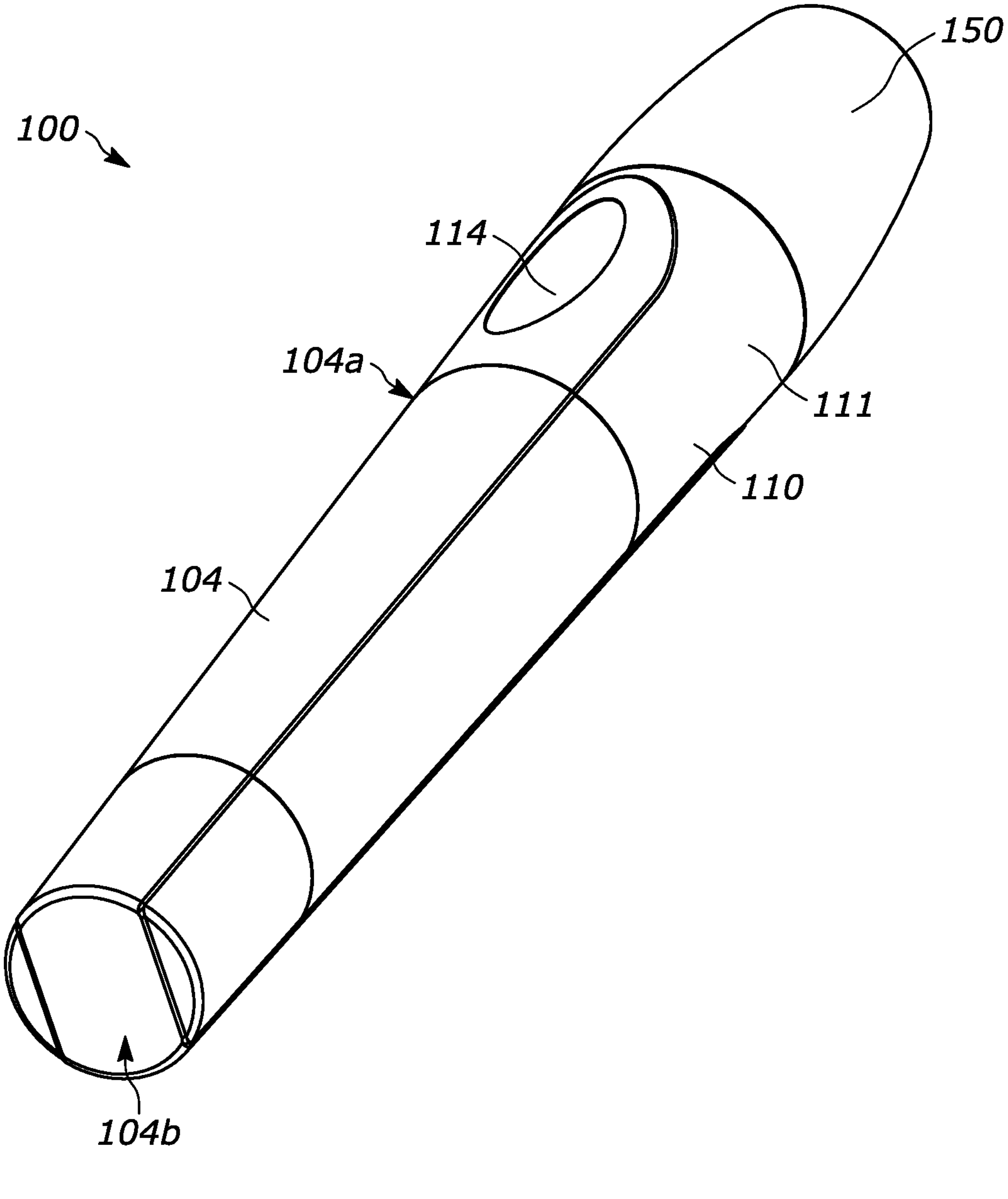
FIG. 4 illustrates a lower perspective view of the example applicator system of FIGS. 1-3 in accordance with various examples.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples. Also, common but well-understood elements that are useful or necessary in a commercially feasible examples are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various approaches, an applicator system is provided that allows a user to precisely dispense and apply a controlled, predetermined quantity (e.g., a micro dosage) of a cosmetic, a hair care, a body care, and/or a skincare product such as, for example, a concealer formula, and allows the product to be applied and blended in an ergonomic and even manner. In some examples, the system may reduce air bubbles and/or other inconsistencies during dispensing and application, thereby providing a smooth application that reduces and/or eliminates texture marks.

Turning to the Figures, an applicator system 100 is provided for containing and dispensing a cosmetic substance 102. The applicator system 100 includes a container or cartridge 104, a dispensing mechanism 110, and an applicator 130. The cosmetic substance 102 may be any type of cosmetic, hair care, body care, and/or skincare product that may be applied to a user. For example, the cosmetic substance 102 may be in the form of a concealer formula. Other examples are possible. In some examples where the cosmetic substance 102 is a cosmetic formula, it may include strong or otherwise aggressive chemicals and/or solvents such as, for example, volatiles.

Figure 5:
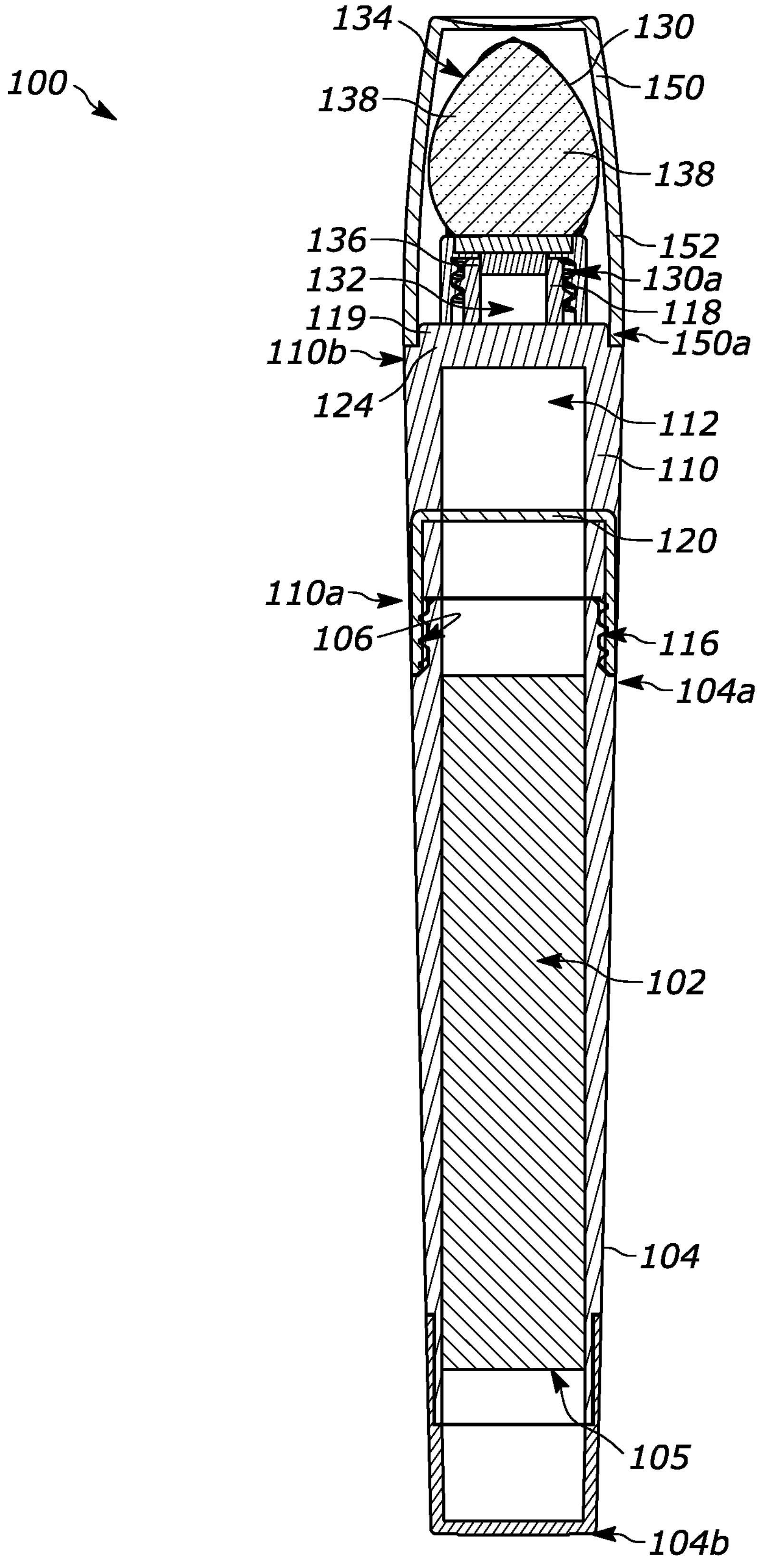
FIG. 5 illustrates a front elevation cross-sectional view of the example applicator system of FIGS. 1-4 in accordance with various examples.
Figure 6:
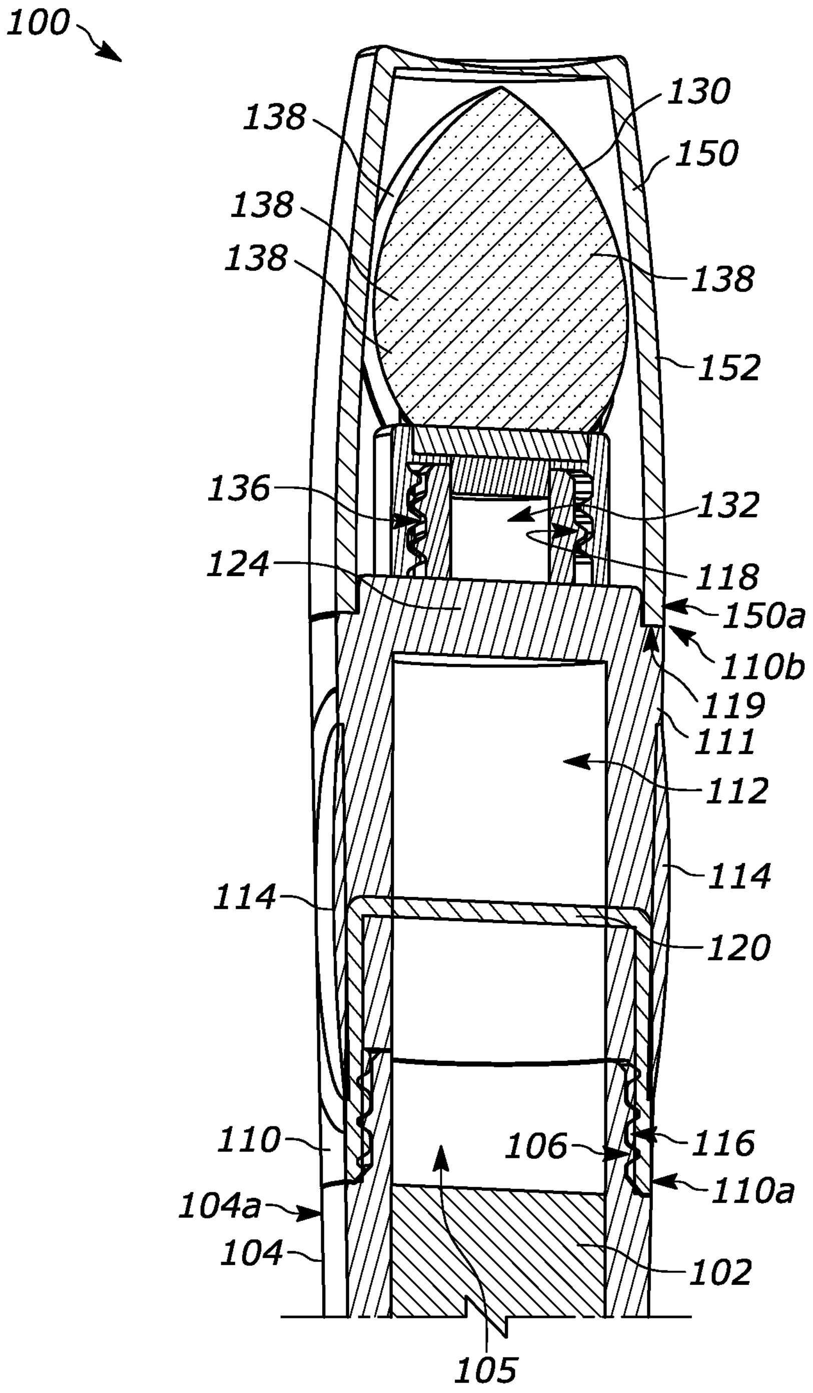
FIG. 6 illustrates a perspective cross-sectional view of the example applicator system of FIGS. 1-5 in accordance with various examples.

The container 104 has a first end 104*a*, a second end 104*b*, and defines a cavity 105 dimensioned to retain the cosmetic substance 102. The container may be constructed from any number of suitable materials such as, for example, a polymeric material, a metallic material, and/or a glass material. Other examples are possible. In some examples, the first end 104*a* of the container 104 may be open, and the second end 104*b* of the container 104 may be closed. As illustrated in FIGS. 5 & 6, in some examples, the first end 104*a* of the container 104 may include a threaded coupling region 106. In some examples, the container may be at least partially constructed from a transparent and/or a translucent material, and may accommodate between approximately 3 ml and approximately 15 ml of cosmetic substance 102. More specifically, in some examples, the cavity 105 may be dimensioned to accommodate approximately 6 ml of cosmetic substance 102. In some forms (not illustrated), the container 104 may be configured to receive an internal pouch that may be removable therefrom.

The dispensing mechanism 110 is operably coupled with the first end 104*a* of the container 104 and has a first end 110*a* and a second end 110*b* that defines an elongated body 111. An interior portion of the elongated body 111 defines a dispensing cavity 112. The elongated body 111 also includes at least one flexible region 114 that may be engageable (e.g., depressible and/or squeezable) by a user to decrease a volume of the dispensing cavity 112. In some examples, the at least one flexible region 114 is constructed from a bi-injected soft touch material such as a fluorosilicate. In some examples, the elongated body 111 may include an opening or openings in which the at least one flexible region 114 is disposed. The at least one flexible region 114 may assist with increasing grippability and actuation.

In the illustrated example, the first end 110*a* of the dispensing mechanism 110 may be operably coupled with the first end 104*a* of the container 104. More specifically, in these examples, the first end 110*a* of the dispensing mechanism 110 includes a threaded coupling region 116 that may threadably engage the corresponding threaded coupling region 106 of the first end 104*a* of the container 104 to allow the dispensing mechanism 110 to be removably coupled with the container 104. It will be appreciated that the container 104 and the dispensing mechanism 110 may be operably coupled with each other via any number of suitable approaches such as, for example, a friction-fit coupling, a tab and protrusion coupling, and the like. Other examples are possible. Further, it will be appreciated that in some examples, the elongated body 111 may be entirely or mostly constructed from a flexible material.

With particular reference to FIGS. 5 & 6, in some examples, the dispensing mechanism 110 includes a first orifice restriction 120 and a second orifice restriction 124. More specifically, in these examples, each of the first and second orifice restrictions 120, 124 are in the form of one-way valves that may selectively be opened and closed. The first one-way valve 120 is positioned at the first end 110*a* of the elongated body 111 of the dispensing mechanism 110. The second one-way valve 124 is positioned at the second end 110*b* of the elongated body 111 of the dispensing mechanism 110. As a result, the dispensing cavity 112 is defined by the elongated body 111 and the first and second one-way valves 120, 124. Like the flexible region 114, in some examples, the first and second one-way valves 120, 124 may be constructed from a bi-injected soft touch material such as a fluorosilicate. As a result, when the desired cosmetic substance 102 is composed of strong, potentially abrasive chemical formulations, the dispensing mechanism 110 may safely retain the substance 102 without degrading or otherwise deteriorating the device.

The applicator 130 has a first end 130*a*, an interior cavity 132, and an external surface 134. The first end 130*a* of the applicator 130 may include a threaded coupling region 136 in the form of a rigid collar that allows the applicator 130 to threadably couple with the second end 110*b* of the dispensing mechanism 110. In the illustrated examples, the second end 110*b* of the dispensing mechanism 110 includes a second threaded coupling region 118 that engages the threaded coupling region 136 of the applicator 130. It is appreciated that in some examples, other suitable types of coupling mechanisms may be used to removably couple the applicator 130 with the dispensing mechanism 110 such as, for example, a friction-fit coupling, a tab and protrusion coupling, and the like. Other examples are possible. So configured, the interior cavity 132 of the applicator 130 is positioned adjacent to the dispensing cavity 112 of the dispensing mechanism 110, and the second one-way valve 124 is positioned therebetween.

In some examples, the applicator 130 is constructed from a flocked soft foam having channels 138 that allow the cosmetic substance 102 to flow from the interior cavity 132 to the external surface 134 thereof. By using a flocked foam, the external surface 134 allows for a smooth application of the cosmetic substance 102. In some examples, the channels 138 may be laser-cut. In other words, the applicator 130 may be micro-perforated to allow the cosmetic substance 102 to diffuse through and spread evenly at the external surface 134 of the applicator 130. In some examples, the applicator is approximately 5 mm thick and may have a domed, slanted face having a petal shape that mimics a user's finger with a width of approximately 17 mm. In these and other examples, a tip of the applicator 130 may be pointed to allow for targeted application of the cosmetic substance 102. Other examples are possible. For example, in some approaches, the applicator 130 may have a tube disposed therewithin. The tube may be constructed from any number of suitable materials such as, for example, a flexible member that moves and/or bends when pressure is applied to the applicator 130, but may still provide increased support during application of the cosmetic substance 102. In some examples, the tube may itself define a channel that directs the cosmetic substance 102 from the dispensing cavity 112 to an upper end of the applicator 130. Other examples are possible.

The applicator system 100 may further include a cap 150 having a first end 150*a* and a body 152. As illustrated in FIGS. 5 & 6, the first end 150*a* of the cap 150 is adapted to be removably coupled with a portion of the dispensing mechanism 110. More specifically, in the illustrated example, the dispensing mechanism 110 includes a ledge 119 positioned near the second end 110*b* thereof that is dimensioned to frictionally couple with the first end 150*a* of the cap 150. It is appreciated that in other examples, the cap 150 may be threadably coupled with the dispensing mechanism 110. Other suitable coupling mechanisms may be used. The body 152 of the cap 150 may be flared to allow for a larger applicator 130. Further, like the second end 104*b* of the container 104, the cap 150 may be flat at an end or top surface to allow the applicator system 100 to stand upside down on a horizontal surface.

In operation, the applicator system 100 is prepared by filling the cavity 105 with a cosmetic substance 102. The first end 110*a* of the dispensing mechanism 110 is coupled with the first end 104*a* of the container 104, and the first one-way valve 120 retains the cosmetic substance 102 within the cavity 105. The applicator 130 is then operably coupled with the second end 110*b* of the dispensing mechanism, whereby the second one-way valve 124 is positioned between the dispensing cavity 112 and the internal cavity 132. The applicator system is then primed or placed in an initial state by engaging or squeezing the flexible region or regions 114, thereby causing the air disposed within the dispensing cavity 112 to open the second one-way valve 124 and to be expelled therefrom. Upon releasing the flexible region or regions 114, the second one-way valve 124 closes, thereby creating a vacuum within the dispensing cavity 112 that in turn causes the first one-way valve 120 to open and draw a predetermined quantity (e.g., between approximately 5 microliters and approximately 20 microliters and preferably approximately 10 microliters) into the dispensing cavity 112. It is appreciated that the dimensions of the dispensing cavity 112 and/or the elasticity or resilience of the first and second one-way valves 120, 124 may be modified as desired to cause a specified quantity of cosmetic substance 102 to be drawn into the dispensing cavity 112. Further, it is appreciated that in some examples, during a manufacturing step, the dispensing cavity 112 may be initially filled with the cosmetic substance 102.

Once the applicator system 100 is primed in an initial state where a quantity of cosmetic substance 102 is disposed within the dispensing cavity 112, a user may again engage the flexible region or regions 114. This engagement by a user causes the cosmetic substance 102 to be expelled from the dispensing cavity 112 via the second one-way valve 124, whereupon it enters the interior cavity 132 of the applicator 130. Upon releasing the flexible region or regions 114, the second one-way valve 124 closes and again creates a vacuum within the dispensing cavity 112 that causes the first one-way valve 120 to open and draw an additional quantity of cosmetic substance 102 into the dispensing cavity 112.

The user may then apply the cosmetic substance 102 by pressing the external surface 134 of the applicator 130 against their skin, which causes the cosmetic substance 102 disposed within the interior cavity 132 of the applicator 130 to flow through the applicator 130 and onto the external surface 134 thereof. Upon applying the cosmetic substance 102, the user may secure the cap 150 with the dispensing mechanism.

Because the applicator system 100 includes threadable or otherwise removable components, the applicator 130 may be separated from the remainder of the applicator system 100 as desired and interchanged with different applicators having desired geometries and/or other characteristics such as, for example, softer or more rigid foam materials. Accordingly, the system 100 may be customizable to meet varying consumer demands. Such a removable arrangement further allows the applicator 130 to be adequately cleaned and replaced as needed, which may be advantageous in retail environments to promote hygienic practices.

Further, the applicator system 100 may be reusable. More specifically, in some examples, upon using all of the cosmetic substance 102, a user may remove the container 104 from the dispensing mechanism 110 and return the container 104 to the manufacturer. The user may then purchase a standalone container 104 having a seal or cap arrangement (not illustrated) on the first end 104*a* thereof, and subsequently couple the dispensing mechanism 110 therewith. Such a system may result in significant reductions in packaging waste.

So configured, the system allows a consumer to actuate, apply, and blend the product in a single swipe or motion. The applicator head geometry allows the product to diffuse to the surface for a more homogenous application, while the pointy upper region of the applicator head provides better application. By providing two orifice restrictions, displacement within the dispensing mechanism is accurately controlled, which is not possible with existing systems and pumping mechanisms. Further, because each of the components are removably coupled with each other, the system 100 may be readily customized as desired by a user.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. An applicator system for containing and dispensing a cosmetic substance, the system comprising:

a container defining a cavity and including an outermost wall, an open first end and a closed second end;

a dispensing mechanism including an elongated body and at least one flexible region engageable by a user, the elongate body having an outer wall directly coupled to the outermost wall of the container, a first orifice restriction and a second orifice restriction wherein the first orifice restriction has a first portion positioned within the elongate body and a second portion extending from the first portion and directly secured to the open first end of the container, the outer wall of the elongated body and the at least one flexible region defining a dispensing cavity; and an applicator having an external surface and an interior cavity adapted to accommodate at least a portion of the dispensing mechanism;

wherein upon engaging the at least one flexible region of the dispensing mechanism, a predetermined quantity of cosmetic substance is dispensed to the external surface of the applicator, wherein a flow path for the cosmetic substance between the cavity of the container and the interior cavity is defined only by the outermost wall of the container, the outer wall of the elongate body of the dispensing mechanism, the flexible region, the first orifice restriction, and the second orifice restriction.

2. The applicator system of claim 1, wherein at least one of the first orifice restriction or the second orifice restriction is constructed from a liquid silicone rubber material.

3. The applicator system of claim 1, wherein the first and second orifice restrictions each include a one-way valve adapted to selectively permit and/or restrict the cosmetic product from flowing through the dispensing cavity.

4. The applicator system of claim 3, wherein when the applicator system is in an initial state, the predetermined quantity of cosmetic substance is disposed within the dispensing cavity, wherein upon engaging the at least one flexible region of the dispensing mechanism, the predetermined quantity of cosmetic substance is dispensed through the second orifice restriction and to the interior cavity of the applicator.

5. The applicator system of claim 4, wherein upon the predetermined quantity of cosmetic substance being dispensed through the second orifice restriction, the second orifice restriction closes, thereby generating a vacuum within the dispensing cavity that causes a second predetermined quantity of cosmetic substance to be drawn from the cavity of the container through the first orifice and to the dispensing cavity.

6. The applicator system of claim 1, wherein the applicator includes a flow through head adapted to diffuse the cosmetic substance to the external surface thereof.

7. The applicator system of claim 1, wherein the applicator is constructed from an open cell foam material.

8. The applicator system of claim 1, wherein the dispensing mechanism is adapted to dispense a predetermined quantity of cosmetic substance of approximately 10 microliters upon engaging the at least one flexible region thereof.

9. The applicator system of claim 1, wherein the dispensing mechanism is removably coupled with the container.

10. The applicator system of claim 1, wherein the applicator is removably coupled with the dispensing mechanism.

11. A method of dispensing a cosmetic substance from an applicator system including a container defining a cavity and including an outermost wall, an open first end and a closed second end, a dispensing mechanism including an elongated body and at least one flexible region engageable by a user, the elongated body having an outer wall directly coupled to the outermost wall of the container, a first orifice restriction and a second orifice restriction wherein the first orifice restriction has a first portion positioned within the elongate body and a second portion extending from the first portion and directly secured to the open first end of the container, the outer wall of the elongate body and the at least one flexible region defining a dispensing cavity, and an applicator having an interior cavity adapted to accommodate at least a portion of the dispensing mechanism, a flow path for the cosmetic substance between the cavity of the container and the interior cavity defined only by the outermost wall of the container, the outer wall of the elongate body of the dispensing mechanism, the flexible region, the first orifice restriction, and the second orifice restriction, the method comprising:

disposing a predetermined quantity of cosmetic substance within the dispensing cavity of the dispensing mechanism;

engaging the at least one flexible region of the dispensing mechanism, thereby causing the predetermined quantity of cosmetic substance to be dispensed through the dispensing cavity and to the applicator;

releasing the at least one flexible region of the dispensing mechanism, thus forming a vacuum within the dispensing cavity that causes a subsequent predetermined quantity of cosmetic substance to be drawn into the dispensing cavity.

12. The method of claim 11, wherein the first and second orifice restrictions each include a one-way valve.

13. The method of claim 11, wherein at least one of the first orifice restriction or the second orifice restriction is constructed from a liquid silicone rubber material.

14. The method of claim 11, wherein the predetermined quantity of cosmetic substance is approximately 10 microliters.

* * * * *